(12) United States Patent
Bae et al.

(10) Patent No.: US 8,938,043 B2
(45) Date of Patent: Jan. 20, 2015

(54) ADAPTIVE OPTIMUM CDR BANDWIDTH ESTIMATION BY USING A KALMAN GAIN EXTRACTOR

(71) Applicants: Korea Advanced Institute of Science and Technology, Daejeon (KR); TeraSquare Co., Ltd., Seoul (KR)

(72) Inventors: Hyeon Min Bae, Seoul (KR); Joon Yeong Lee, Gangwon-Do (KR); Hyo Sup Won, Daejeon (KR); Jong Hyeok Yoon, Seoul (KR); Jin Ho Park, Seoul (KR); Tae Ho Kim, Daejeon (KR)

(73) Assignee: TeraSquare Co., Ltd., Seoul (KR)

( * ) Notice: Subject to any disclaimer, the term of this patent is extended or adjusted under 35 U.S.C. 154(b) by 0 days.

(21) Appl. No.: 13/833,321

(22) Filed: Mar. 15, 2013

(65) Prior Publication Data

US 2013/0259178 A1 Oct. 3, 2013

Related U.S. Application Data

(60) Provisional application No. 61/617,205, filed on Mar. 29, 2012.

(51) Int. Cl.
*H03D 3/24* (2006.01)
*H04L 27/00* (2006.01)
*H04L 7/00* (2006.01)
*H04L 7/033* (2006.01)

(52) U.S. Cl.
CPC ............. *H04L 7/007* (2013.01); *H04L 7/0331* (2013.01)
USPC .......................................... 375/376; 375/326

(58) Field of Classification Search
CPC .............. H04L 7/033; H04L 25/03057; H04L 2025/0349; H03L 7/0891
USPC ........... 375/376, 326, 344, 371; 327/307, 516
See application file for complete search history.

(56) References Cited

U.S. PATENT DOCUMENTS

| 7,587,013 B2 * | 9/2009 | Seo et al. ...................... 375/354 |
| 8,410,834 B2 * | 4/2013 | Lin et al. ........................ 327/146 |
| 8,471,611 B2 * | 6/2013 | Sfikas et al. .................. 327/156 |
| 2010/0290516 A1 * | 11/2010 | Lee et al. ..................... 375/239 |

* cited by examiner

*Primary Examiner* — Khai Tran
(74) *Attorney, Agent, or Firm* — Marshall, Gerstein & Borun LLP

(57) ABSTRACT

Exemplary embodiments of the present invention relate to a clock and data recovery (CDR) apparatus with adaptive optimum CDR bandwidth estimation by using a Kalman gain extractor. The Kalman gain extractor includes an off chip digital processor which receives a phase update information from the CDR outputs an estimated optimum Kalman gain obtained by extracting the standard deviation of step sizes of the accumulation jitter from the power spectral density (PSD) of the phase update information, and a on chip digital loop filter consists of a cyclic accumulator which accumulates the phase detector's output, a gain multiplier and a phase interpolator (or DCO) controller. The off chip digital processor includes a storage register, a fast Fourier transform (FFT) processor and an optimum Kalman gain estimator. The storage register stores the phase update information, from which the FFT processor extracts the PSD of the absolute input jitter. The optimum Kalman gain estimator calculates the optimum gain from the PSD of the accumulation jitter. The off chip digital processor may further include a gain calibrator to compensate for the variations in the transition density.

8 Claims, 15 Drawing Sheets

ADAPTIVE OPTIMUM CDR BANDWIDTH ESTIMATION BY USING A KALMAN GAIN EXTRACTOR

BACKGROUND OF THE INVENTION

1. Field of the Invention

Exemplary embodiments of the present invention relate to a clock and data recovery (CDR) apparatus with adaptive optimum CDR bandwidth estimation by using a Kalman gain extractor.

2. Discussion of the Background

The input jitter of a clock and data recovery (CDR) can be modeled as the sum of the accumulation and periodic jitter. The periodic jitter does not accumulate over time and has bounded variance in general.

Data-dependent deterministic jitter is a subset of the periodic jitter. The accumulation jitter, on the contrary, is unbounded in nature and increases indefinitely with time, thus a CDR has to track it for bit-error-free operation.

The analogy between the Kalman filter and a bang-bang (BB) CDR is utilized for the analytical minimum bounds of the mean squared phase error of a BB CDR circuit under the condition of random phase tracking.

SUMMARY OF THE INVENTION

An exemplary embodiment of the present invention discloses a clock and data recovery (CDR) apparatus with adaptive optimum CDR bandwidth estimation by using a Kalman gain extractor comprising a clock generator configured to provide frequency locked clocks to a digitally controlled phase rotator, a bang-bang phase detector (BBPD) and a Kalman gain extractor configured to estimate an optimum Kalman gain for a loop filter connected to the BBPD and the phase rotator.

The Kalman gain extractor includes an on-chip digital loop filter and an off-chip digital processor to receive phase update information from the CDR apparatus and output the optimum Kalman gain.

The on-chip digital loop filter includes a cyclic accumulator, a gain multiplier and a phase interpolator controller.

The off-chip digital processor outputs the optimum Kalman gain obtained by extracting a standard deviation of step sizes of an accumulation jitter from power spectral density (PSD) of the phase update information.

The off-chip digital processor includes, a storage register configured to store the phase update information and a fast Fourier transform (FFT) processor configured to extract PSD of an absolute input jitter from the phase update information.

The off-chip digital processor further includes, an optimum Kalman gain estimator configured to calculate the optimum Kalman gain from the PSD of an accumulation jitter.

The off-chip digital processor further includes, a gain calibrator configured to compensate for variations in transition density.

The Kalman gain extractor includes, a Kalman filter configured to find the optimum Kalman gain by minimizing a posterior MSE recursively.

The BBPD includes a demultiplexer modeled by parallel BBPDs with a subsequent summation block.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

according to an exemplary embodiment of the present invention.

Figure 6:
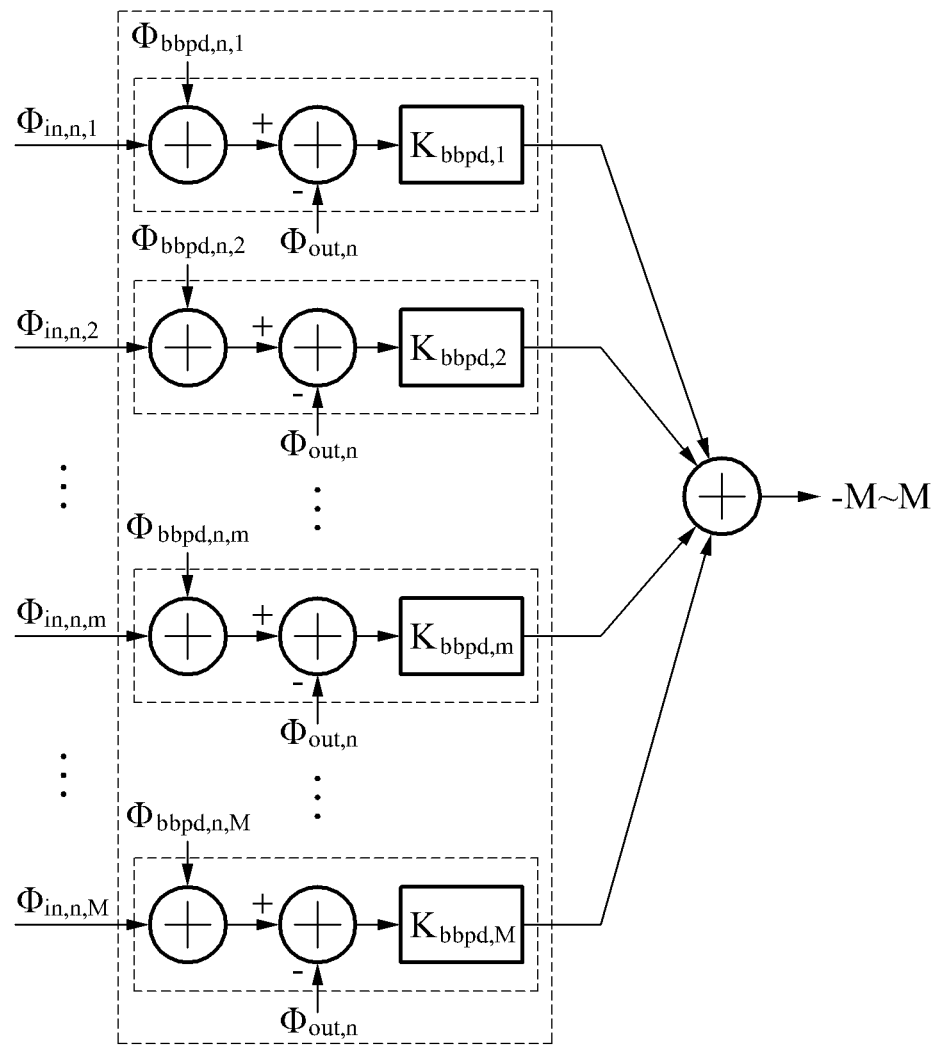

FIG. 6 is a view illustrating an example of the linearized discrete-time block diagram of a 1:M demultiplexed parallel BBPD (bang-bang phase detector) according to an exemplary embodiment of the present invention.

Figure 7:
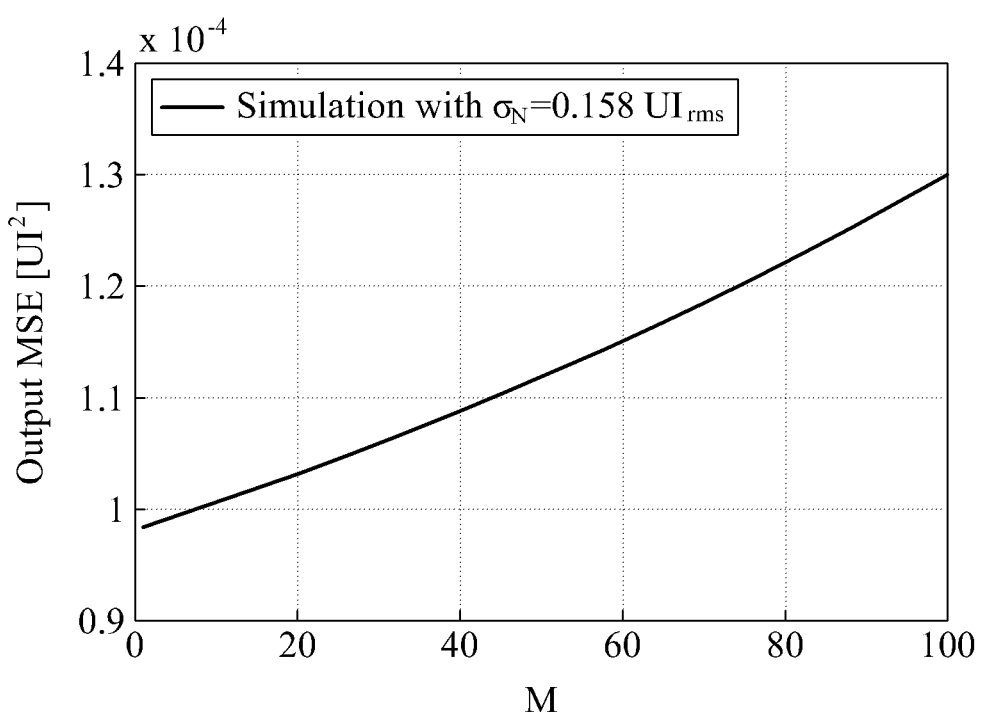

FIG. 7 shows output MSE of the demuxed BB CDR versus M, with $$\sigma_W = \frac{0.6\pi}{\sqrt{2}} \times 10^{-4} UI_{rms}$$

and $\sigma_N = 0.158 UI_{rms}$ according to an exemplary embodiment of the present invention.

Figure 8:
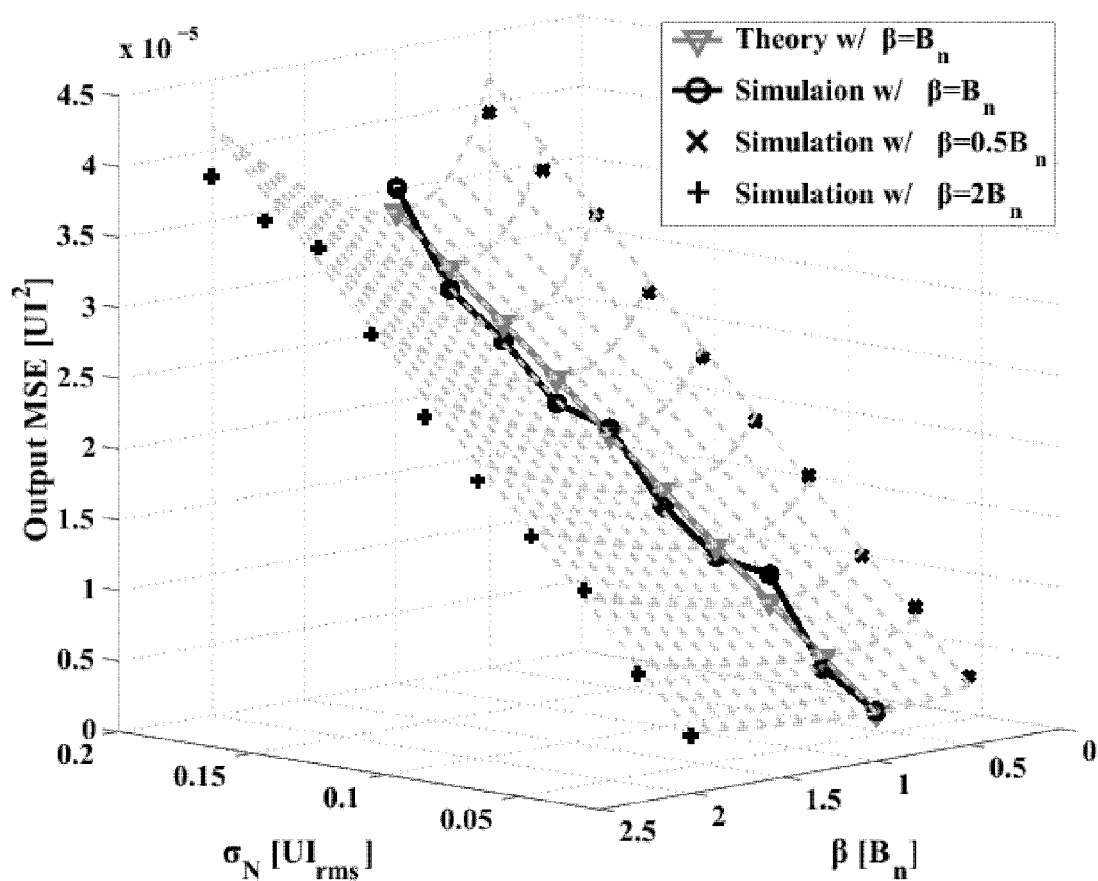

FIG. 8 shows the analytical and simulated MSEs of a 1:8 demultiplexed BB CDR with Kalman gain according to an exemplary embodiment of the present invention.

Figure 9:
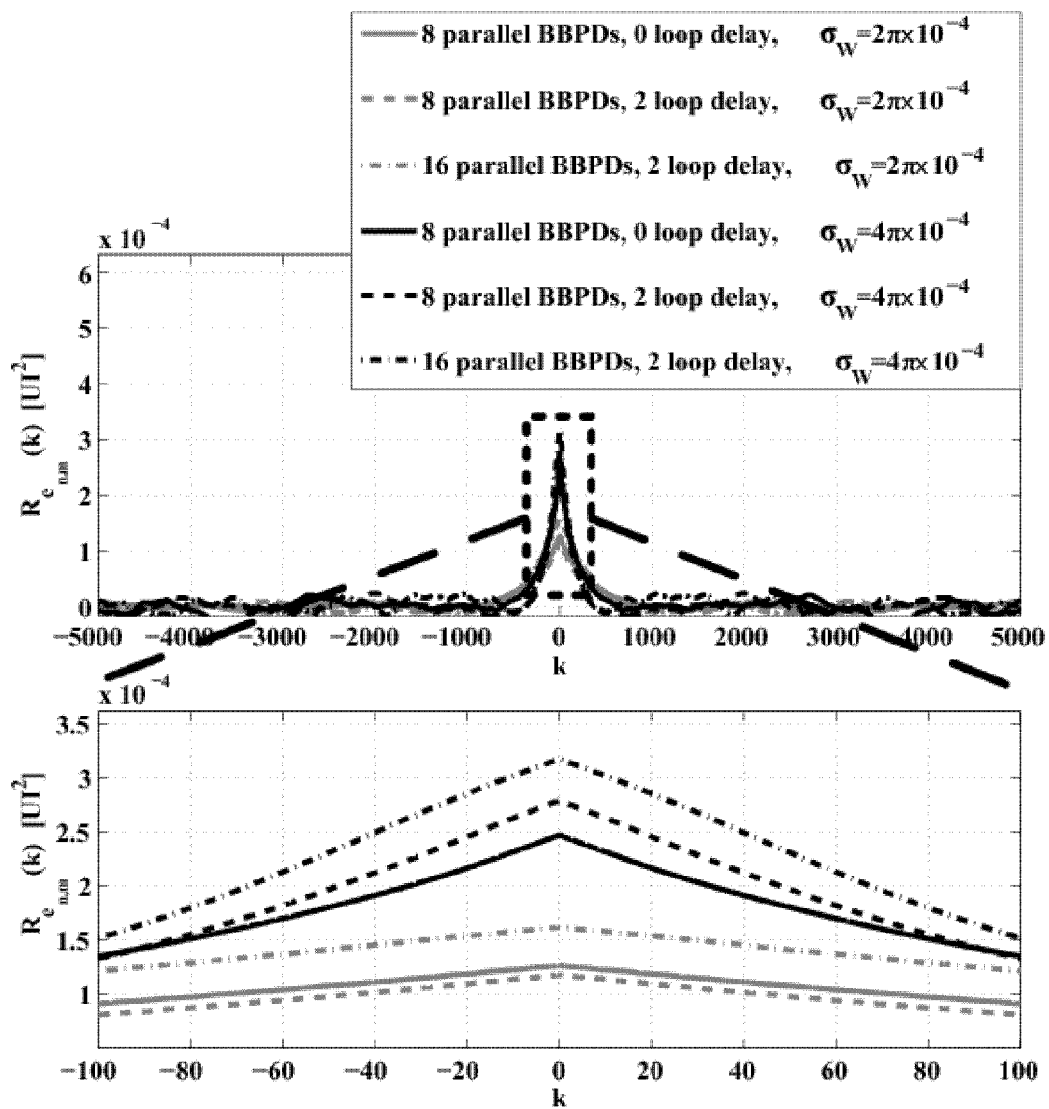

FIG. 9 shows the simulated autocorrelation of $e_{n,m}$ for various levels of parallelization, loop delays, and input accumulation jitters according to an exemplary embodiment of the present invention.

Figure 10:
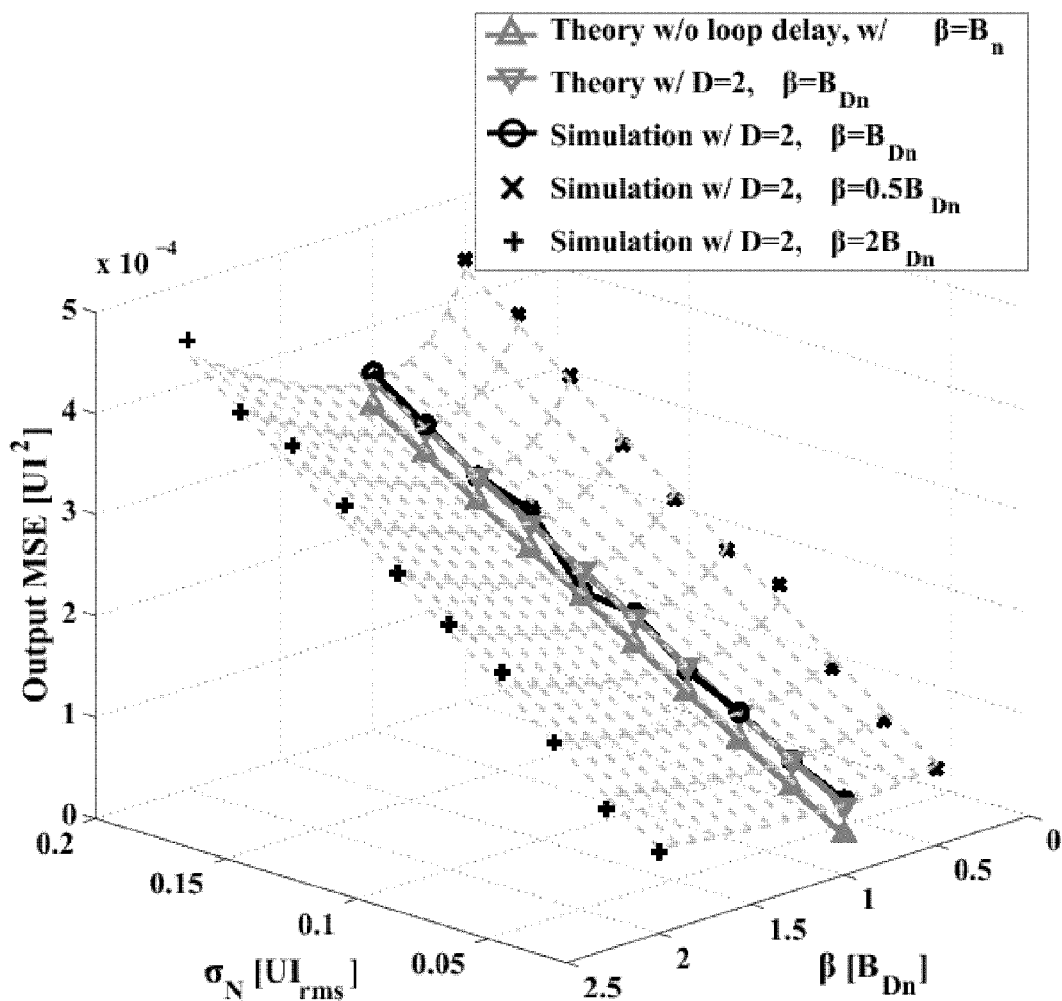

FIG. 10 shows the analytical and simulated MSEs with various loop gains according to an exemplary embodiment of the present invention.

Figure 11:
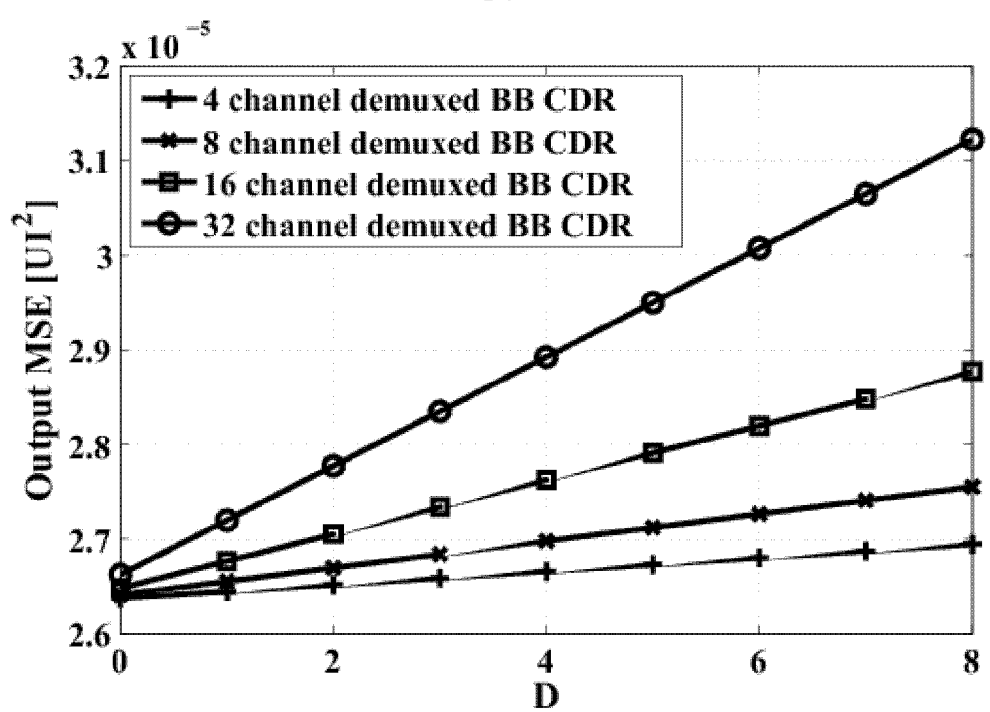

FIG. 11 shows the relationship between the minimum MSE bound and loop delay D under various demultiplexing ratios according to an exemplary embodiment of the present invention.

Figure 12:
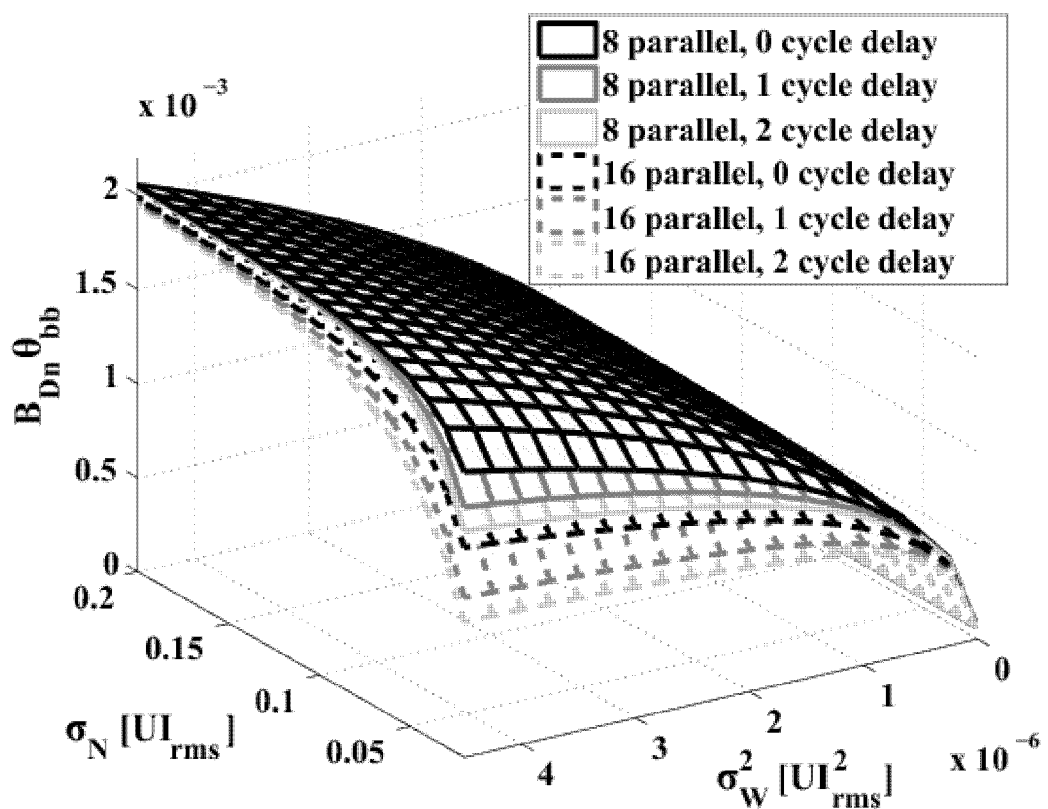

FIG. 12 shows $B_{Dn}\theta_{pr}$ versus $\sigma_N$ and $\sigma_W^2$ according to an exemplary embodiment of the present invention.

Figure 13:
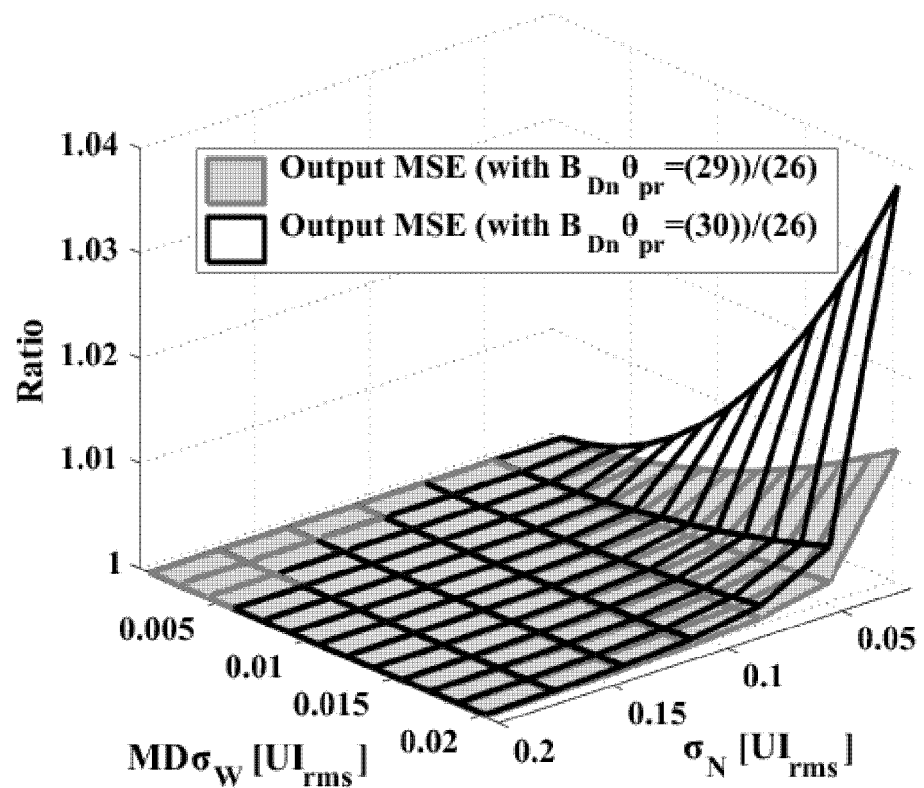

FIG. 13 shows the ratio between the output MSEs and optimum gain $B_{DN}\theta_{pr}$ versus $MD\sigma_W$ and $\sigma_N$ according to an exemplary embodiment of the present invention.

Figure 14:
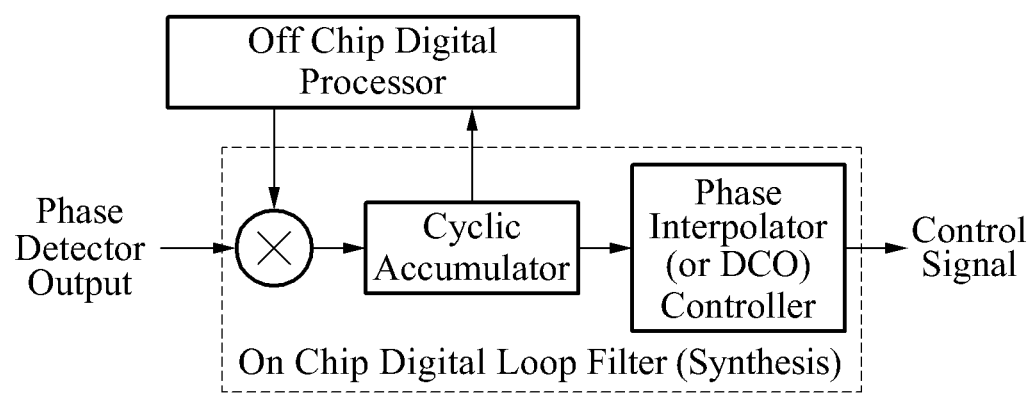

FIG. 14 is a view illustration an example of the block diagram of the Kalman gain extractor according to an exemplary embodiment of the present invention.

Figure 15:
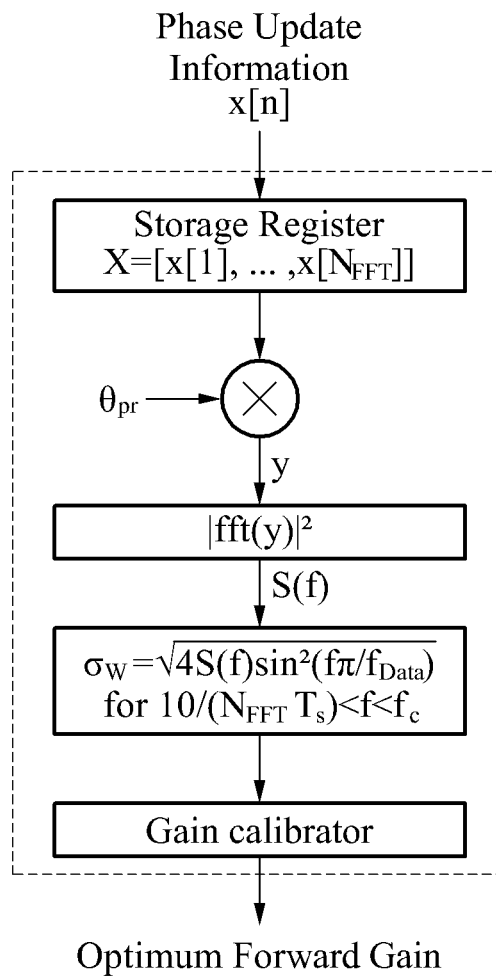

FIG. 15 is a view illustration an example of the block diagram of the off chip digital processor according to an exemplary embodiment of the present invention.

DETAILED OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereafter, an exemplary embodiment of the present invention will be described in detail with reference to the accompanying drawings. It is noted that the same reference numerals are used to denote the same elements throughout the drawings. In the following description of the present invention, the detailed description of known functions and configurations incorporated herein is omitted when it may make the subject matter of the present invention unclear.

Figure 1:
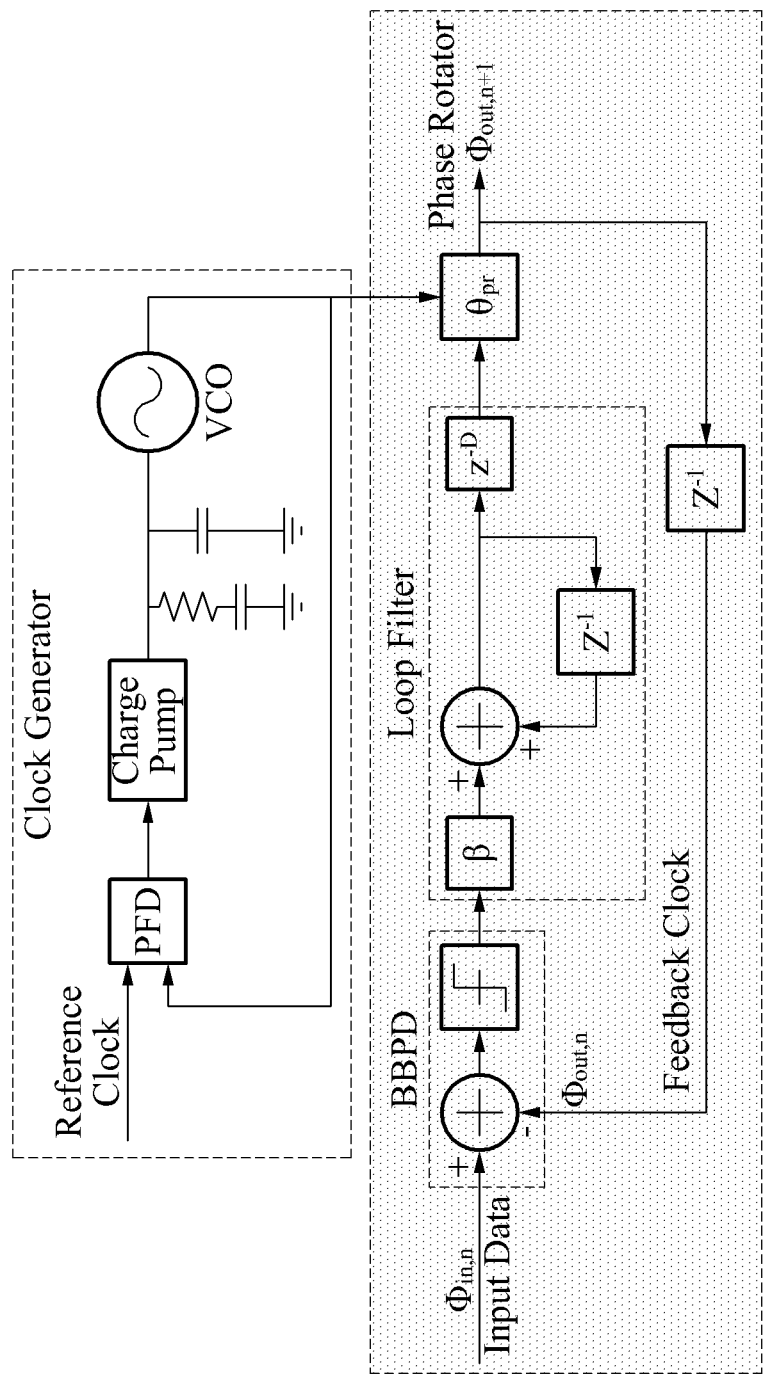
FIG. 1 is a view illustrating an example of Z-domain block diagram of a typical rotator-based BB CDR with a clock generator according to an exemplary embodiment of the present invention.

FIG. 1 is a view illustrating an example of Z-domain block diagram of a typical rotator-based BB CDR (Bang-bang clock and data recovery) with a clock generator according to an exemplary embodiment of the present invention. A clock generator may provide frequency locked clocks to a digitally controlled phase rotator. Analysis in this specification may be restricted to the phase rotator loop shown in the shaded area. For an exemplary embodiment of the present invention, CDR (clock and data recovery) apparatus comprising CDR circuit to execute CDR can be modeled as the following CDR model. The CDR model may consist of a BBPD (bang-bang phase detector), a loop filter with the gain and delay of β and D, respectively, and a digitally controlled phase rotator. The gain of a phase rotator $\theta_{pr}$ may be related to its resolution, as given by the following Equation 1.

$$\theta_{pr} = \frac{1UI}{2^{RotatorResolution}} \qquad \text{[Equation 1]}$$

The input jitter of a CDR can be modeled as the sum of the accumulation and non-accumulative period jitter. The non-accumulative period jitter may not accumulate over time and have bounded variance in general. Data-dependent deterministic jitter may be a subset of the non-accumulative jitter. The accumulation jitter, on the contrary, may be unbounded in nature and increases indefinitely with time, thus a CDR may have to track it for bit-error-free operation.

Figure 2:
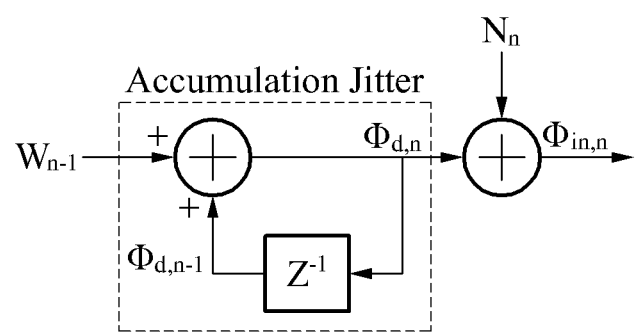
FIG. 2 is a view illustrating an example of discrete time model of input jitter according to an exemplary embodiment of the present invention.

FIG. 2 is a view illustrating an example of discrete time model of input jitter according to an exemplary embodiment of the present invention. $\phi_{d,n}$ and $N_n$ may denote the accumulation and non-accumulative period jitter, respectively, at time index n. The accumulation jitter may be modeled by a discrete time random walk process. By using the Z-transform, the power spectral density of the accumulation jitter may be shown as the following Equation 2.

$$S(f) = \frac{E[W^2]}{(1-z^{-1})(1-z)}\bigg|_{z=e^{-j2\pi f/f_{Data}}} = \frac{E[W^2]}{4\sin^2(f\pi/f_{Data})}, \qquad \text{[Equation 2]}$$

where $E[W^2]$ may be the variance of random period jitter W, and $f_{Data}$ may be the data rate. By taking the bilinear transformation of the Equation 2 for simplicity, the following Equation 3 can be derived.

$$S(f) = \frac{E[W^2](1+(f\pi/f_{Data})^2)}{(2f\pi/f_{Data})^2} \qquad \text{[Equation 3]}$$

S(f) may decrease by −20 dB/decade as frequency increases.

Figure 3:
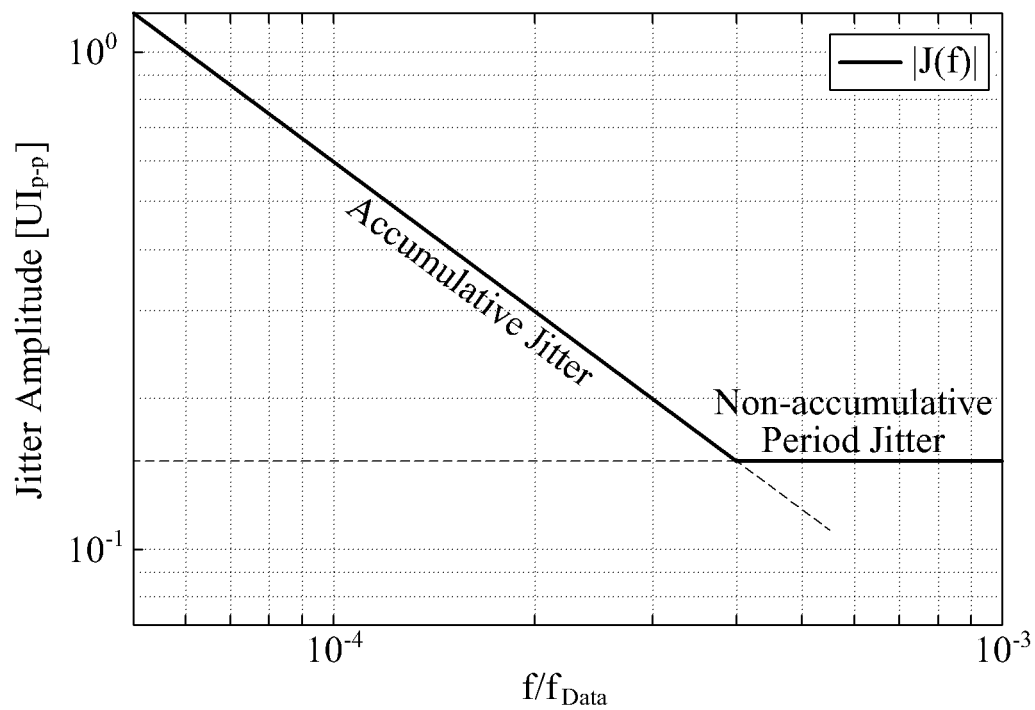
FIG. 3 shows typical shape of jitter tolerance mask according to an exemplary embodiment of the present invention.

A jitter tolerance mask may provide the information on the accumulation and random non-accumulative period jitter of a serial link. FIG. 3 shows typical shape of jitter tolerance mask according to an exemplary embodiment of the present invention. The accumulation jitter may dominate at low frequencies and decrease by −20 dB/decade as frequency increases. In a SONET (Synchronous optical network) jitter tolerance mask, the magnitude of random non-accumulative period jitter may intersect with the accumulation jitter at ½500th of the data rate.

The magnitude of S(f) can be estimated with the jitter tolerance mask since it may represent the maximum permissible jitter present in a communication link. Even if the practical jitter in a link is hardly composed of sinusoids, the jitter tolerance specification may be defined with sinusoids for testing purposes. In practice, the jitter in serial links carrying real traffic may be more like random noise.

Appropriate values for $\sigma_W$ and $\sigma_N$ can be estimated by matching the variances of the modeled jitter in FIG. 2 with that of a sinusoid defined in the jitter tolerance mask. Let the magnitude of the jitter tolerance mask be J(f), and W and N are white Gaussian processes. |S(f)| may have to satisfy |S(f)|=|J(f)|²/8. For a SONET jitter mask, $\sigma_W$ and $\sigma_N$ may be $$\frac{0.6\pi}{\sqrt{2}} \times 10^{-4} UI_{rms}$$

and $0.053 UI_{rms}$ respectively, and $\sigma_N \gg \sigma_W$.

Figure 4:
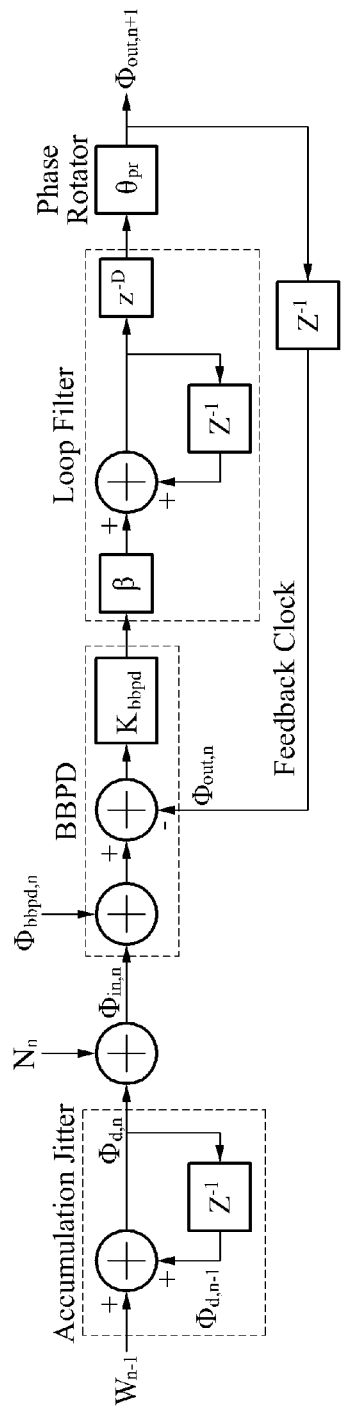
FIG. 4 is a view illustrating an example of phase-domain discrete-time model of a linearized BB CDR and input jitter according to an exemplary embodiment of the present invention.

FIG. 4 is a view illustrating an example of phase-domain discrete-time model of a linearized BB CDR and input jitter according to an exemplary embodiment of the present invention. A nonlinear BBPD may be linearized by using a Markov chain analogy in phase lock. The linearized BBPD may consist of linear gain $K_{bbpd}$ with quantization noise $\phi_{bbpd}$. The equivalent gain $K_{bbpd}$ may be given by the following Equation 4.

$$K_{bbpd} = \frac{1}{\sqrt{2\pi}\,\sigma_J}\left[1 + e^{-\frac{1}{2}\left(\frac{\beta\theta_{pr}}{\sigma_J}\right)^2}\right] \qquad \text{[Equation 4]}$$

where $\sigma_J$ may be the standard deviation of the relative input Gaussian jitter $\phi_J = \phi_{in} - \phi_{out}$. $\phi_{bbpd}$ which can be modeled by a white randon process uncorrelated with $\phi_J$ if $\sigma_J \gg \beta\theta_{pr}$. The standard deviation of $\phi_{bbpd}$ may be approximately $0.75\sigma_J$. In case $\sigma_J \leq 0.5\beta\theta_{pr}$, the dynamics of a BB CDR may be merely nonlinear.

n-th prediction error $e_n$ may be expressed as the following Equation 5.

$$e_n = \phi_{d,n} - \phi_{out,n} \qquad \text{[Equation 5]}$$

where $\phi_{d,n}$ and $\phi_{out,n}$ may be the n-th desired and the output clock phases, respectively. If computational latency D is neglected, for simplicity, the n+1-th prediction error $e_{n+1}$ may be recursively given by the following Equation 6.

$$e_{n+1} = \phi_{d,n+1} - \phi_{out,n+1} = (1 - K_{bbpd}\beta\theta_{pr})e_n + W_n - K_{bbpd}\beta\theta_{pr}(N_n + \phi_{bbpd,n}) \qquad \text{[Equation 6]}$$

The MSE (Mean Squared Error) of the n+1-th prediction error may be expressed as the following Equation 7.

$$E[e_{n+1}^2] = (1 - K_{bbpd}\beta\theta_{pr})^2 E[e_n^2] + \quad \text{[Equation 7]}$$
$$E[W_n^2] + K_{bbpd}^2 \beta^2 \theta_{pr}^2 \left( E[N_n^2] + \frac{9}{16}\sigma_J^2 \right)$$

where $E[\phi_{bbpd,n}^2] \approx 9\sigma_J^2/16$ under phase lock. Provided that the CDR bandwidth may be sufficiently large to track the accumulation jitter, $\sigma_J^2$ may be approximately $E[W^2]+E[N^2]$. By setting $E[e_{n+1}^2]=E[e_n^2]=E[e_\infty^2]$, the steady state MSE may be given by the following Equation 8.

$$E[e_\infty^2] = \frac{\left(1 + \frac{9}{16}K_{bbpd}^2\beta^2\theta_{pr}^2\right)E[W^2] + \frac{25}{16}K_{bbpd}^2\beta^2\theta_{pr}^2 E[N^2]}{2K_{bbpd}\beta\theta_{pr} - K_{bbpd}^2\beta^2\theta_{pr}^2} \quad \text{[Equation 8]}$$

where $$E[W_n^2] = E[W^2] \text{ and } E[N_n^2] = E[N^2].$$

Figure 5:
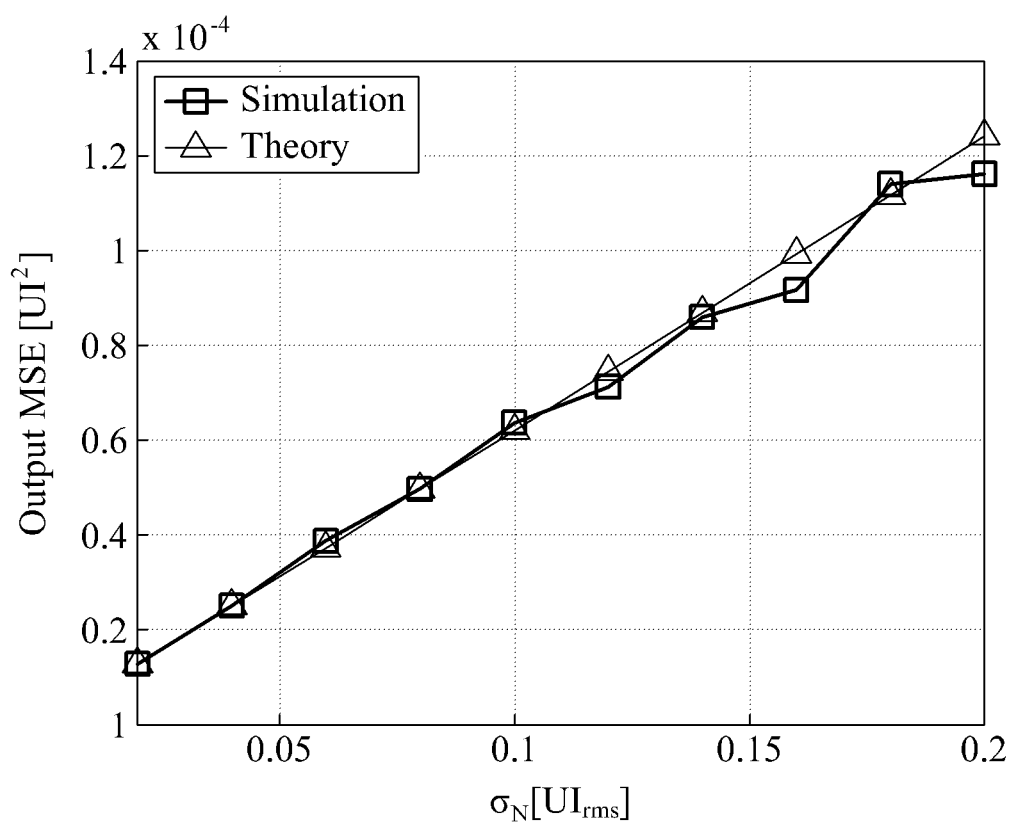
FIG. 5 shows output MSE (Mean Squared Error) of the single BB CDR with $$\sigma_W = \frac{0.6\pi}{\sqrt{2}} \times 10^{-4} UI_{rms}$$

FIG. 5 shows the analytical and simulated MSEs of a BB CDR with $$\sigma_W = \frac{0.6\pi}{\sqrt{2}} \times 10^{-4} UI_{rms}.$$

The gain of the loop filter may be set $\beta=1$. The behavioral simulation results may validate the theoretical analysis in the meaningful $\sigma_N$ range.

High-speed digital domain CDRs typically may make parallel demultiplexed subrate phase updates due to timing constraints of digital logic blocks.

FIG. 6 is a view illustrating an example of the linearized discrete-time block diagram of a 1:M demultiplexed parallel BBPD according to an exemplary embodiment of the present invention. A demultiplexer may be modeled by parallel BBPDs with a subsequent summation block.

$e_{n,m}$ may be the n-th prediction error of the m-th channel in the set of parallel BBPDs as given by $e_{n,m}=\phi_{d,n,m}-\phi_{out,n,m}$. The time and channel indices may satisfy $-\infty<n<\infty$ and $0<m\leq M$, respectively, where k indices may satisfy M may be the level of parallelization. The linearized gain of the m-th BBPD, $K_{bbpd,m}$ may be $2/\sqrt{2\pi(m\sigma_W^2+\sigma_N^2)}$, since the random jitter W may be accumulated for m cycles. In the case of $\sigma_W \ll \sigma_N$, this linearized gain may become insensitive to the channel index m and can be approximated as $K_{bbpd,m} \approx 2/(\sqrt{2\pi}\sigma_N)=K_{bbpd}$. A recursive equation for the n+1-th prediction error of the first channel, $e_{n+1,1}$ is given by the following Equation 9.

$$e_{n+1,1}=e_{n,M}+W_{n,1}-(Me_{n,1}+\Sigma_{k=2}^{M}(M+1-k)W_{n-1,k}+\Sigma_{k=1}^{M}(N_{n,k}+\phi_{bbpd,n,k}))K_{bbpd}\beta\theta_{pr} \quad \text{[Equation 9]}$$

$e_{n,m}$ may be related to $e_{n,1}$ by the following Equation 10 since the phase updates occur every M-th input signal.

$$e_{n,m}=e_{n,1}+\Sigma_{k=2}^{m}W_{n-1,k} \quad \text{[Equation 10]}$$

The following Equation 11 may be derived by substituting Equation 10 into Equation 9, $$e_{n+1,1}=e_{n,1}+\Sigma_{k=2}^{M}W_{n-1}+W_{n,1}-(Me_{n,1}+\Sigma_{k=2}^{M}(M+1-k)W_{n-1,k}+\Sigma_{k=1}^{M}(N_{n,k}+\phi_{bbpd,n,k}))K_{bbpd}\beta\theta_{pr}. \quad \text{[Equation 11]}$$

The MSE of the first channel is given by the following Equation 12.

$$E[e_{n+1,1}^2] = (1 - MK_{bbpd}\beta\theta_{pr})^2 E[e_{n,1}^2] + \quad \text{[Equation 12]}$$
$$\sum_{k=1}^{M-1}(1-(M-k)K_{bbpd}\beta\theta_{pr})^2 E[W_{n-1,k+1}^2] +$$
$$\frac{9}{16}\frac{M(M+1)(2M+1)}{6}\beta^2 K_{bbpd}^2 \theta_{pr}^2 E[W^2] +$$
$$E[W^2] + \frac{25}{16}M\beta^2 K_{bbpd}^2 \theta_{pr}^2 E[N^2]$$

where $$E\left[\left(\sum_{k=1}^{M}\phi_{bbpd,n,k}\right)^2\right] = (9/16)\sum_{k=1}^{M}(\sigma_N^2 + k^2\sigma_W^2)$$

phase lock. By defining the MSE at n+1-th clock cycle as the average MSE among M parallel channels, the following Equation 13 can be obtained.

$$E[e_{n+1}^2] = \frac{\sum_{k=1}^{M} E[e_{n+1,k}^2]}{M} = E[e_{n+1,1}^2] + \frac{M-1}{2}E[W^2] \quad \text{[Equation 13]}$$

By substituting Equation 12 into Equation 13, the following Equation 14 can be derived.

$$E[e_{n+1}^2] = (1 - MK_{bbpd}\beta\theta_{pr})^2 E[e_n^2] + \quad \text{[Equation 14]}$$
$$\left(M + \left(\frac{\frac{9}{16}\frac{M(M+1)(2M+1)}{6} -}{\frac{M(M-1)(M+1)}{6}}\right)\beta^2 K_{bbpd}^2 \theta_{pr}^2\right)$$
$$E[W^2] + \frac{25}{16}M\beta^2 K_{bbpd}^2 \theta_{pr}^2 E[N^2],$$

where $E[W_{n-1,k}^2] = E[W_{n,k}^2] = E[W^2]$ and $$E[N_{n-1,k}^2] = E[N_{n,k}^2] = E[N^2].$$

The steady state MSE may given by the following Equation 15.

$$E[e_\infty^2] = \frac{ME[W^2] + M\beta^2 K_{bbpd}^2 \theta_{pr}^2 \eta}{2MK_{bbpd}\beta\theta_{pr} - M^2 K_{bbpd}^2 \beta^2 \theta_{pr}^2} \quad \text{[Equation 15]}$$

where $\eta = \lambda E[W_n^2] + \frac{25}{16} E[N_n^2]$ and $$\lambda = \frac{9}{16}\frac{(M+1)(2M+1)}{6} - \frac{(M-1)(M+1)}{6}.$$

FIG. 7 shows output MSE of the demuxed BB CDR versus M, with $$\sigma_W = \frac{0.6\pi}{\sqrt{2}} \times 10^{-4} UI_{rms}$$

and $\sigma_N=0.158 \, UI_{rms}$ according to an exemplary embodiment of the present invention. The MSE may increase in proportion to M since the phase update latency degrades the tracking performance.

The Kalman filter may be a discrete time minimum MSE estimator that finds the optimum Kalman gain by minimizing the posterior MSE recursively. The tracking error in a BB CDR can be minimized by incorporating the Kalman filter algorithm in selecting the optimum forward gain β. The optimum Kalman gain may achieve the optimum balance between tracking the accumulation jitter and filtering the non-accumulative period jitter.

$B_n$ may be β at time index n. By taking the derivative of $E[e_{n+1}^2]$ in Equation 14 with respect to $B_n$, the following Equation 16 may be derived.

$$\frac{dE[e_{n+1}^2]}{dB_n} = -2(1 - MK_{bbpd}B_n\theta_{pr})MK_{bbpd}\theta_{pr}E[e_n^2] + \left(\frac{9}{16}\frac{M(M+1)(2M+1)}{3} - \frac{M(M-1)(M+1)}{3}\right)$$
$$B_n K_{bbpd}^2 \theta_{pr}^2 E[W^2] + \frac{25}{8} MB_n K_{bbpd}^2 \theta_{pr}^2 E[N^2]$$
[Equation 16]

Optimum Kalman gain $B_n$ satisfying $dE[e_{n+1}^2]/dB_n=0$ may be expressed as the following Equation 17.

$$B_n = \frac{1}{K_{bbpd}\theta_{pr}} \frac{E[e_n^2]}{ME[e_n^2] + \lambda E[W_n^2] + \frac{25}{16}E[N_n^2]}$$
[Equation 17]

By substituting Equation 17 into Equation 14 for simplicity, the following Equation 18 may be derived.

$$E[e_{n+1}^2] = (1 - MB_n K_{bbpd}\theta_{pr})E[e_n^2] + ME[W_n^2]$$
[Equation 18]

Equation 17 and Equation 18 may yield the recursive procedure that constitutes the Kalman filtering algorithm. The steady state MSE may be expressed as the following Equation 19.

$$E[e_\infty^2] = \frac{ME[W^2] + \sqrt{M^2 E[W^2]^2 + 4\eta E[W^2]}}{2}$$
[Equation 19]

where $$E[W_n^2] = E[W^2]$$

and $$E[N_n^2] = E[N^2].$$

Equation 19 may indicate the minimum MSE bound of a BB CDR.

FIG. 8 shows the analytical and simulated MSEs of a 1:8 demultiplexed BB CDR with Kalman gain according to an exemplary embodiment of the present invention. In this case, FIG. 8 shows the analytical and simulated MSEs of a 1:8 demultiplexed BB CDR under various gains with $$\sigma_W = \frac{0.6\pi}{\sqrt{2}} \times 10^{-4} UI_{rms},$$

and D=0. The theoretical and simulated results may show close agreement, and the MSEs may be minimized when the Kalman gains are applied.

As described above, implementation non-idealities such as latency in the loop filter and quantization noise from the phase rotator may be neglected for simplicity in the analysis. Control latency, however, may degrade the tracking performance of a CDR by decreasing the closed loop phase margin. Digitally controlled phase rotators may have limited resolution for the output phase. Reduced resolution may relax the complexity of a rotator while degrading the jitter performance of a CDR.

In case delay in the loop filter D may be nonzero, Equation 11 may be modified as the following Equation 20.

$$e_{n+1,1} = e_{n,1} + \Sigma_{k=2}^M W_{n-1,k} + W_{n,1} - (Me_{n-D,1} + \Sigma_{k=2}^M (M+1-k)W_{n-D-1,k} + \Sigma_{k=1}^M (N_{n-D,k} + \phi_{bbpd,n-D,k}))K_{bbpd}\theta_{pr}.$$
[Equation 20]

According to Equation 20, $K_{bbpd}$ can be approximated as $K_{bbpd}=2q_0/(\sqrt{2\pi}\sigma_J)$ if $\sigma_J < B_n/K_{bbpd}$, where $q_0$ is ½, ⅓, and ⅕ for D=0, 1 and 2, respectively. However, in the case of $\sigma_J > B_n/K_{bbpd}$, $K_{bbpd}=2/(\sqrt{2\pi}\sigma_J)$ and may be independent of the loop delay.

In order to calculate the MSE under nonzero loop delay, the correlation between $e_{n,1}$ and $e_{n-D,1}$ may be considered.

FIG. 9 shows the simulated autocorrelation of $e_{n,m}$ for various levels of parallelization, loop delays, and input accumulation jitters according to an exemplary embodiment of the present invention when gain $B_n$, defined in Equation 17 is used.

In this case, FIG. 9 shows simulated autocorrelation of $e_{n,m}$ with $\sigma_N=0.158\ UI_{rms}$. The autocorrelation $R_{e_{n,m}}(k)$, may given by $E[err(MN+m)err(MN+m+k)]$, where $err(Mn+m)=e_{n,m}$. It may demonstrate that $e_{n,m}$ can be approximated as a make $B_n$ white process except in the vicinity of the origin clearly. Small $E[e_{n,1}e_{n-D,1}]$ may make $B_n$ remain close to the optimum value under nonzero loop delay. Close examination of FIG. 9 may reveal that the slope of the autocorrelation near the origin is close to $E[W^2]$, irrespective of D and M. By using this observation result, the expectation value of $e_{n,1}e_{n-D,1}$ can be approximated as the following Equation 21.

$$E[e_{n,1}e_{n-D,i}] \approx E[e_{n,1}^2] - MDE[W_n^2]$$
[Equation 21]

By using Equation 21, $E[(e_{n,1}-MB_{Dn}K_{bbpd}\theta_{pr}e_{n-D,1})^2]$ may become the following Equation 22.

$$E[(e_{n,1}-MB_{Dn}K_{bbpd}\theta_{pr}e_{n-D,1})^2]=(1-MB_{Dn}K_{bbpd}\theta_{pr})^2 E[e_{n,1}^2]+2M^2 DB_{Dn}K_{bbpd}\theta_{pr}E[W_n^2].$$
[Equation 22]

From Equation 20 and Equation 22, the recursive MSE equation with nonzero D may be expressed as the following Equation 23.

$$E[e_{n+1}^2] = (1 - MK_{bbpd}B_{Dn}\theta_{pr})^2 E[e_n^2] + \left(M + \left(\frac{9}{16}\frac{M(M+1)(2M+1)}{6} - \frac{M(M-1)(M+1)}{6}\right)\right) B_{Dn}^2 K_{bbpd}^2 \theta_{pr}^2$$
$$E[W^2] + \frac{25}{16} MB_{Dn}^2 K_{bbpd}^2 \theta_{pr}^2 E[N^2] +$$
$$2M^2 DB_{Dn} K_{bbpd} \theta_{pr} E[W^2],$$
[Equation 23]

where $B_{Dn}$ may denote the Kalman gain with loop delay. By taking a similar approach to Equation 16, Kalman gain $B_{Dn}$ may be expressed as the following Equation 24.

$$B_{Dn} = \frac{1}{K_{bbpd}\theta_{pr}} \frac{E[e_n^2] - MDE[W_n^2]}{ME[e_n^2] + ME[e_n^2] + \frac{25}{16}E[N_n^2]}$$
[Equation 24]

The Kalman gain under control latency may be smaller than Equation 17, because only low frequency prediction error may be valid. By the way, in most cases, the tracking error may satisfy $E[e_n^2]>>E[W^2]$ in the locked condition, than $B_{Dn}{\approx}D_n$. By substituting Equation 24 into Equation 23, the following Equation 25 may be derived.

$$E[e_{n+1}^2]=(1-MB_{Dn}K_{bbpd}\theta_{pr})E[e_n^2]+(M+M^2DB_{Dn}K_{bbpd}\theta_{pr})E[W_n^2] \quad \text{[Equation 25]}$$

and the steady state MSE may be the following Equation 26.

$$E[e_\infty^2] = \frac{(2D+1)ME[W^2]}{2} + \frac{\sqrt{M^2(4D+1)E[W^2]^2 + 4\eta E[W^2]}}{2} \quad \text{[Equation 26]}$$

where $$E[W_n^2] = E[W^2]$$

and $$E[N_n^2] = E[N^2].$$

Equation 26 may represent the generalized minimum MSE bound of a BB CDR. This bound may be equal to Equation 19, when D=0.

FIG. 10 shows the analytical and simulated MSEs with various loop gains according to an exemplary embodiment of the present invention. In this case, FIG. 10 shows the analytical and simulated MSEs of a 1:8 demultiplexed BB CDR with Kalman gain with $\sigma_W=4\pi \times 10^{-4}$ UI$_{rms}$, D=2. The analytical results may match strongly with the simulated results, and it may be clear that the MSE is at a minimum when the optimum gain $B_{Dn}$ is employed.

FIG. 11 shows the relationship between the minimum MSE bound and loop delay D under various demultiplexing ratios according to an exemplary embodiment of the present invention. In this case, FIG. 11 shows the relationship between the minimum MSE bound and loop delay D when $$\sigma_W = \frac{0.6\pi}{\sqrt{2}} \times 10^{-4} UI_{rms}$$

and $\sigma_N=0.158$ UI$_{rms}$. The minimum MSE bound may increase in proportion to D and M.

FIG. 12 shows $B_{Dn}\theta_{pr}$ versus $\sigma_N$ and $\sigma_W^2$ according to an exemplary embodiment of the present invention. In this case, FIG. 12 shows the optimum value of $B_{Dn}\theta_{pr}$ for the minimum MSE with respect to $\sigma_N$ and $\sigma_W^2$ in steady state. $B_{Dn}\theta_{pr}$ may be be inversely proportional to D and M and proportional to the variances of the non-accumulative period and accumulation jitter.

By substituting Equation 26 into Equation 24, the optimum forward gain $B_{Dn}\theta_{pr}$ may be given by the following Equation 27.

$$B_{Dn}\theta_{pr} = \frac{\sqrt{2\pi}\,\sigma_N}{2}\left(M\sigma_W^2 + \sqrt{M^2(4D+1)\sigma_W^4 + 4\eta\sigma_W^2}\right) \Big/ \quad \text{[Equation 27]}$$

$$\left( \begin{array}{c}(2D+1)M^2\sigma_W^2 + \\ M\sqrt{M^2(4D+1)\sigma_W^4 + 4\eta\sigma_W^2} + 2\lambda\sigma_W^2 + \frac{25}{8}\sigma_N^2\end{array} \right)$$

In the case of $\sigma_W<<\sigma_N$, $\sqrt{M^2(4D+1)\sigma_W^4+4\eta\sigma_W^2}\approx(5/2)\sigma_W\sigma_N$, and hence, Equation 27 can be simplified to Equation 28.

$$B_{Dn}\theta_{pr} \approx \frac{M\sigma_W^2 + \frac{5}{2}\sigma_W\sigma_N}{2M\sigma_W + \frac{5}{2}\sigma_N} \quad \text{[Equation 28]}$$

By using a Taylor series, Equation 28 can be further simplified as given by the following Equation 29 and Equation 30.

$$B_{Dn}\theta_{pr} \approx \left(1 - \frac{2M\sigma_W}{5\sigma_N}\right)\sigma_W \quad \text{[Equation 29]}$$

$$\approx \sigma_W \quad \text{[Equation 30]}$$

Because a PLL is designed to track the accumulation jitter, the forward gain, which represents the bandwidth of a PLL, may have to be mainly related to the accumulation jitter; the optimum bandwidth may be approximately the standard deviation of the step size of the accumulation jitter.

FIG. 13 shows the ratio between the output MSEs and optimum gain $B_{Dn}\theta_{pr}$ versus $MD\sigma_W$ and $\sigma_N$ according to an exemplary embodiment of the present invention. In this case, FIG. 13 shows the ratio between the output MSEs simulated with Equation 29, Equation 30, and optimum $B_{Dn}\theta_{pr}$. The MSE using Equation 29 may be greater than the minimum bound by 1% for $\sigma_N>0.02$ UI$_{rms}$ and $MD\sigma_W<0.02$ UI$_{rms}$. The MSE using Equation 30 may deviate even further from the minimum bound but the difference may be still less than 4% for $\sigma_N>0.02$ UI$_{rms}$ and $MD\sigma_W<0.02$ UI$_{rms}$.

FIG. 14 is a view illustration an example of the block diagram of the Kalman gain extractor according to an exemplary embodiment of the present invention. It may include an off-chip digital processor and an on-chip digital loop filter. The off-chip processor may receive phase update information from the CDR and output an estimated optimum Kalman gain obtained by extracting $\sigma_W$ from the power spectral density (PSD) of the phase update information. For example, $\sigma_W$ may be the standard deviation of step sizes of the accumulation jitter from the power spectral density (PSD) of the phase update information. The on-chip digital loop filter may consist of a cyclic accumulator which accumulates the phase detector's output, a gain multiplier and a phase interpolator (or DCO) controller.

In case the recovered clock phase may be locked to the input data, the operation of the clock path of a CDR may be similar with the delta modulation. The staircase approximation of the input jitter, $\phi_{q,n}$ may be given by the following Equation 31.

$$\phi_{q,n}=\phi_{q,n-1}+\Sigma_{m=1}^M\beta\theta_{pr}e_{n,m} \quad \text{[Equation 31]}$$

Assuming that the accumulation process starts at zero time, Equation 31 can be approximated as the following Equation 32.

$$\phi_{q,n}=\Sigma_{i=1}^n\Sigma_{m=1}^M\beta\theta_{pr}e_{i,m} \quad \text{[Equation 32]}$$

Therefore, the accumulator output $\Sigma_{i=1}^n\Sigma_{m=1}^M\beta e_{i,m}$ can be considered as $\phi_{q,n}/\theta_{pr}$.

FIG. 15 is a view illustration an example of the block diagram of the off chip digital processor according to an exemplary embodiment of the present invention. In this case, FIG. 15 shows the computational procedure of the optimum bandwidth estimator implemented by using an off chip digital processor. The off chip digital processor may include a storage register, a fast Fourier transform (FFT) processor and an optimum Kalman gain estimator. The storage register may store the phase update information, from which the FFT processor extracts the PSD of the absolute input jitter. The optimum Kalman gain estimator may calculate the optimum gain from the PSD of the accumulation jitter. The off chip digital processor may further include a gain calibrator to compensate for the variations in the transition density The inputs of the off chip digital processor may be phase update information from the cyclic accumulator. The input signal may be stored in a storage register and then a scale factor $\theta_{pr}$ may be multiplied for the phase domain conversion. The UI-domain PSD of the accumulated phase noise, S(f) can be achieved by using a fast Fourier transform (FFT) algorithm. The standard deviation of $\sigma_W$ can be estimated from S(f) since $\sigma_W = \sqrt{4S(f)\sin^2(f\pi/f_{Data})}$. Finally, a calibrator may multiply an architecture-dependent correction factor to $\sigma_W$ considering the resolution of the phase rotator, data transition density and the gain reduction caused by under sampling.

Proper selection of f may be crucial because $\sigma_W$ can be misinterpreted due to computational error at low frequencies and period jitter at high frequencies. The upper 3 dB corner frequency may be determined by the ratio between the variance of the period jitter and $\sigma_W$ as given by $$f_c = \frac{f_{Data}\sigma_W}{2\pi\sigma_N}.$$

The PSD retrieved from the FFT may be valid for frequencies greater than $1/N_{FFT}T_S$, where $N_{FFT}$ and $T_S$ may be the number of points in the FFT and the sampling period, respectively. In order to eliminate the low frequency computational error caused by the limited data storage, the frequency in excess of $10/N_{FFT}T_S$ may have to be chosen. Therefore, $N_{FFT} \gg 10/(f_c T_s)$, the valid frequency range may be $$\frac{10}{N_{FFT}T_S} < f < f_c.$$

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A clock and data recovery (CDR) apparatus with adaptive optimum CDR bandwidth estimation by using a Kalman gain extractor comprising:
    a clock generator configured to provide frequency locked clocks to a digitally controlled phase rotator;
    a bang-bang phase detector (BBPD); and
    a Kalman gain extractor configured to estimate an optimum Kalman gain for a loop filter connected to the BBPD and the phase rotator, wherein the Kalman gain extractor includes,
    an on-chip digital loop filter; and
    an off-chip digital processor to receive phase update information from the CDR apparatus and output the optimum Kalman gain.

2. The CDR apparatus with adaptive optimum CDR bandwidth estimation by using a Kalman gain extractor of claim 1, wherein the on-chip digital loop filter includes a cyclic accumulator, a gain multiplier and one of a phase interpolator controller and DCO controller.

3. The CDR apparatus with adaptive optimum CDR bandwidth estimation by using a Kalman gain extractor of claim 1, wherein the off-chip digital processor outputs the optimum Kalman gain obtained by extracting a standard deviation of step sizes of an accumulation jitter from power spectral density (PSD) of the phase update information.

4. The CDR apparatus with adaptive optimum CDR bandwidth estimation by using a Kalman gain extractor of claim 1, wherein the off-chip digital processor includes,
    a storage register configured to store the phase update information; and
    a fast Fourier transform (FFT) processor configured to extract PSD of an absolute input jitter from the phase update information.

5. The CDR apparatus with adaptive optimum CDR bandwidth estimation by using a Kalman gain extractor of claim 4, wherein the off-chip digital processor further includes,
    an optimum Kalman gain estimator configured to calculate the optimum Kalman gain from the PSD of an accumulation jitter.

6. The CDR apparatus with adaptive optimum CDR bandwidth estimation by using a Kalman gain extractor of claim 5, wherein the off-chip digital processor further includes,
    a gain calibrator configured to compensate for variations in transition density.

7. A clock and data recovery (CDR) apparatus with adaptive optimum CDR bandwidth estimation by using a Kalman gain extractor comprising:
    a clock generator configured to provide frequency locked clocks to a digitally controlled phase rotator;
    a bang-bang phase detector (BBPD); and
    a Kalman gain extractor configured to estimate an optimum Kalman gain for a loop filter connected to the BBPD and the phase rotator, wherein the Kalman gain extractor includes,
    an on-chip digital loop filter; and
    an off-chip digital processor to receive phase update information from the CDR apparatus and output the optimum Kalman gain, and wherein the Kalman gain extractor includes,
    a Kalman filter configured to find the optimum Kalman gain by minimizing a posterior MSE recursively.

8. A clock and data recovery (CDR) apparatus with adaptive optimum CDR bandwidth estimation by using a Kalman gain extractor comprising:
    a clock generator configured to provide frequency locked clocks to a digitally controlled phase rotator;
    a bang-bang phase detector (BBPD); and
    a Kalman gain extractor configured to estimate an optimum Kalman gain for a loop filter connected to the BBPD and the phase rotator, wherein the Kalman gain extractor includes,
    an on-chip digital loop filter; and an off-chip digital processor to receive phase update information from the CDR apparatus and output the optimum Kalman gain, and wherein the BBPD includes a demultiplexer modeled by parallel BBPDs with a subsequent summation block.

* * * * *